United States Patent
Rozmus

[15] 3,698,438
[45] Oct. 17, 1972

[54] VALVE ASSEMBLY

[72] Inventor: Walter J. Rozmus, Hubbardsville, N.Y.

[73] Assignee: Kelsey-Hayes Company, Romulus, Mich.

[22] Filed: July 22, 1970

[21] Appl. No.: 57,215

[52] U.S. Cl.............................................137/625.46
[51] Int. Cl..............................................F16k 11/06
[58] Field of Search.........137/625.46, 625.48, 625.4, 137/625.41, 636.3, 625.47, 597

[56] References Cited

UNITED STATES PATENTS

| | | |
|---|---|---|
| 2,117,456 | 5/1938 | Schellin...............251/317 UX |
| 2,845,949 | 8/1958 | Parker...................251/315 X |
| 3,130,750 | 4/1964 | Post........................137/636.3 |
| 3,167,086 | 1/1965 | Michalski..............251/317 X |
| 3,056,418 | 10/1962 | Adams et al......137/625.41 X |
| 3,519,017 | 7/1970 | Nogier et al............137/625.4 |
| 2,977,987 | 4/1961 | Maynard...........137/625.41 X |
| 3,384,121 | 5/1968 | Spencer................137/625.41 |
| 3,472,279 | 10/1969 | Sanderson............137/625.41 |
| 3,506,036 | 4/1970 | Hare................137/625.4 UX |
| 3,530,889 | 9/1970 | Spencer............137/625.41 X |

*Primary Examiner*—Samuel Scott
*Attorney*—McGlynn, Reising, Milton & Ethington

[57] ABSTRACT

A single handle mixer valve comprising an elastomeric body which sealingly supports a spherical valve member for rotation about two mutually perpendicular axes to regulate degree and balance of flow between two fluid inlets and an outlet. Three embodiments are disclosed.

22 Claims, 7 Drawing Figures

INVENTOR.
Walter J. Rozmus
BY
Bernard, McGlynn & Reising
ATTORNEYS

INVENTOR.
Walter J. Rozmus
BY
Barnard, McGlynn & Reising
ATTORNEYS

INVENTOR.
Walter J. Rozmus
BY
Barnard, McGlynn & Reising
ATTORNEYS

VALVE ASSEMBLY

This invention relates to valve assemblies of the type using a single element to control the degree and balance of flow of two fluids through a single outlet.

Valve assemblies of the type described above are commonly called mixing valve assemblies and are used to control the degree and balance of flow of hot and cold water streams. Such assemblies typically include a single-control element or handle, a single spout or outlet, a pair of inlet passages and a valve member which is moved by the handle to control flow between the inlets and the outlets. It is typical of such assemblies to comprise a large number of components. These components generally include numerous seals, washers, springs, and securing devices to maintain the assembly in an operative condition and to prevent leakage. The number and complexity of components generally make both fabrication and service of such assemblies difficult and expensive.

The present invention provides a valve assembly of the single control element, mixer type in which the number of components is reduced and yet the assembly is completely sealed against leakage, warpage, and other undesirable conditions. In general, the invention comprises a valve assembly having a housing, an elastomeric body which is secured within the housing and which defines a spherical cavity having two inlet passages and an outlet passage. The subject assembly further comprises a spherical valve member which is disposed within the cavity in the elastomeric body in such a fashion as to be solely and completely maintained in position by the body for rotation about two axes to vary the degree and balance of fluid flow between the inlet passages to the cavity and the outlet passage from the cavity. The elastomeric body is placed in the housing and secured in position by means of a simple fastening arrangement such as a pair of complementally threaded parts thereby to resiliently and rotatably maintain the spherical valve element sealed within the spherical cavity.

The subject invention is illustrated herein in three embodiments each of which comprises a housing, an elastomeric body secured within the housing and having a spherical cavity, a spherical valve member within the cavity, and means for rotating the valve member about two axes to vary the degree and balance of fluid flow between two fluid streams. Each embodiment further includes first and second inlet passages in the elastomeric body and an outlet passage in the body and extending from the spherical cavity. A second outlet passage is also formed in the body which is in communication between the outlet passage of the cavity and the outlet passage of the housing. The illustrated embodiments of the subject assembly are each provided with means in the form of a control handle having a stem extending through an opening in the body for rotating the valve element within the cavity about only two axes to vary the degree to which the passage portion of the spherical valve element establishes communication between the inlet and outlet passages thereof. When a fluid path between the inlet and outlet passages of the cavity is established, fluid flows from the inlet to the valve element and through a passage portion therein, through the outlet from the cavity to the second outlet passage in the body, and from that passage to an outlet in the housing which typically includes a spout member.

In a first illustrative embodiment of the invention, the elastomeric body is formed in such a way as to define two adjacent spherical cavities, the first of which receives a spherical valve element and the second of which receives the spherical end portion of a spout member. The second spherical cavity is coextensive with the second outlet passage of the body and is in fluid communication with the outlet passage from the first spherical cavity by virtue of a spaced relationship between the elastomeric body and a portion of the housing.

In a second illustrative embodiment of the invention, the elastomeric body also exhibits two adjacent spherical cavities, the first receiving the spherical valve element and the second being part of the second outlet passage through the body. In the second embodiment the two spherical cavities are interconnected by means of the outlet passage from the first cavity to define a flow path through a spout member which is rotatable about a vertical axis relative to the housing.

In a third embodiment, the elastomeric body is provided with a second outlet passage which extends completely through the body adjacent but spaced from the spherical cavity which receives and holds the valve element. The through extending outlet passage and the spherical cavity are interconnected by means of a short outlet passage from the cavity such that fluid flow between a pair of inlet conduits and the second outlet passage which extends through the body is readily controlled by biaxial motion of the valve element relative to the elastomeric body. In the third embodiment, the control handle preferably includes a stem which is connected directly to the valve element, a ring portion which surrounds the housing and a handle which extends radially from the ring portion.

The three illustrative embodiments of the invention are described in the following specification and shown in the accompanying drawings of which:

Figure 1:
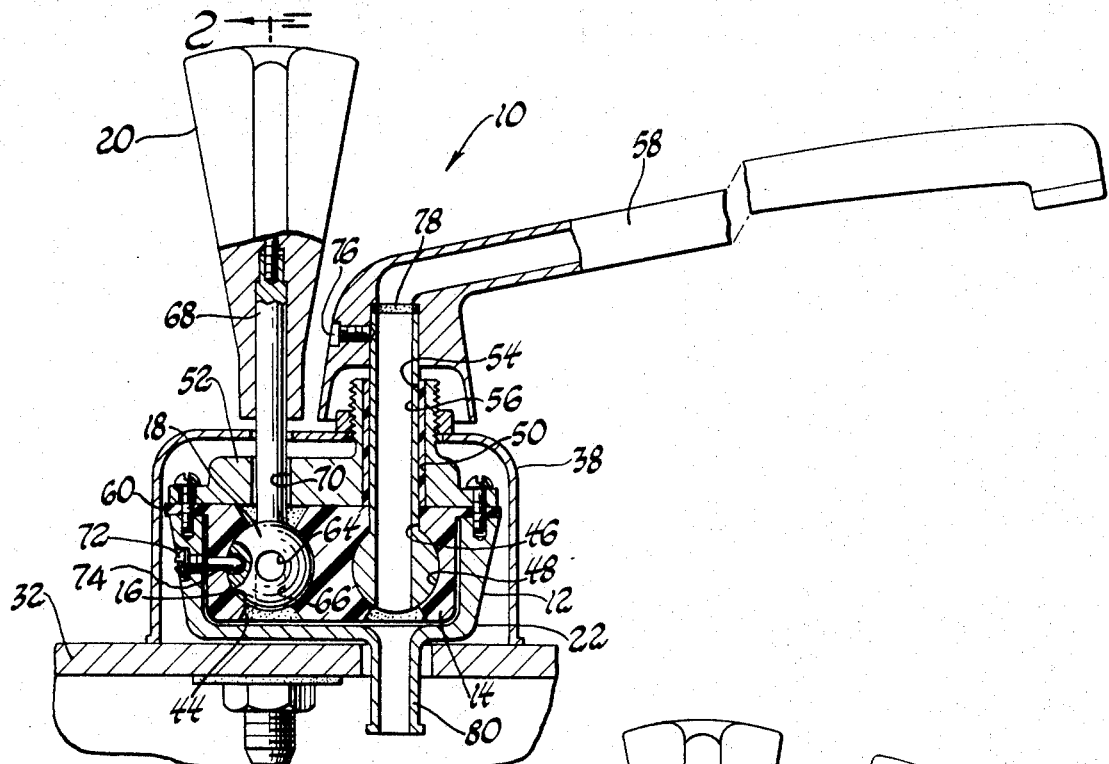
FIG. 1 is a side view partly in cross-section of the first embodiment.
Figure 2:
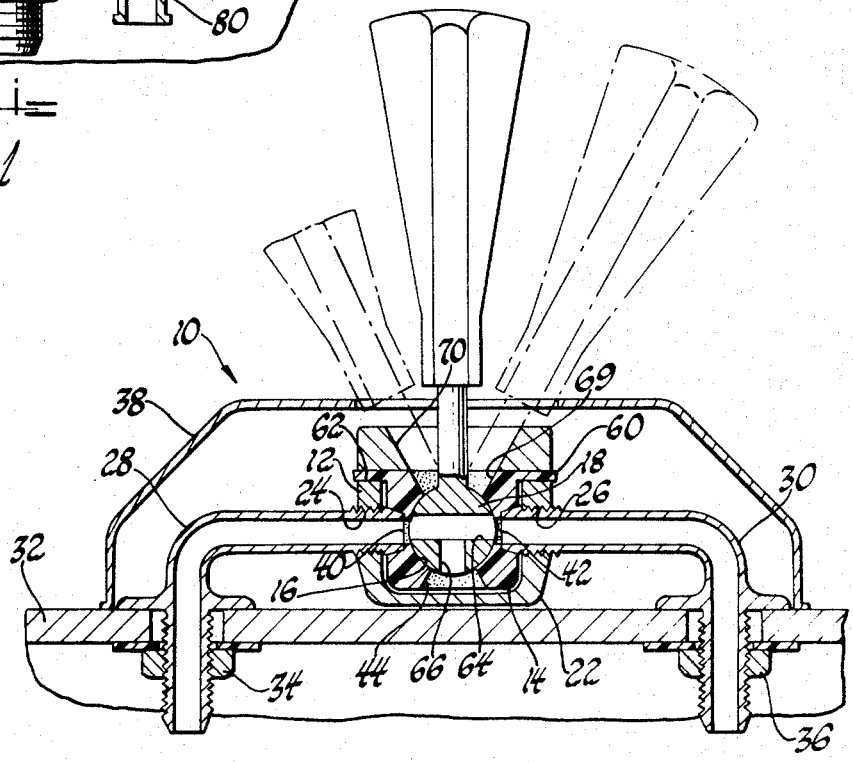
FIG. 2 is a front view partly in cross-section of the first embodiment.

Referring now to FIGS. 1 and 2, a first valve assembly 10 is shown to comprise a housing 12 which is made of steel or other suitable material, a rectangular elastomeric body 14 which is disposed within the housing 12 and which defines a first spherical cavity 16, a spherical valve member 18 disposed within the cavity 16 and a control handle 20 for rotating the valve member 18 about two mutually perpendicular axes.

Housing 12 comprises a cup portion 22 having diametrically opposite threaded inlet passages 24 and 26 for receiving L-shaped hot and cold water conduits 28 and 30, respectively. The conduits 28 and 30 are secured to a support surface 32 such as a sink or counter top by means of conventional threaded fittings 34 and 36 and are adapted to be connected to the hot and cold water supply lines of a domestic water system. A cover 38 which may be made of chromed steel is disposed over the entire assembly to conceal the conduits 28 and 30 as well as the other functional parts of the assembly 10.

Elastomeric body 14 which may be made of buna-N rubber, neoprene, nitrile, or any of a number of other natural or synthetic elastomeric materials comprises diametrically opposite inlet passages 40 and 42 and a beveled, downwardly directed outlet passage 44 of which the inlet passages 40 and 42 are in registration with the inlets 24 and 26 of the housing 12. Elastomeric body 14 further comprises a second outlet passage 46 which extends completely through the body 14 in the vertical direction as best shown in FIG. 1. Passage 46 includes centrally thereof a second spherical cavity 48 which is adjacent, but spaced from, the spherical cavity 16 which contains and supports the valve member 18. Outlet passage 46 is in fluid communication with an outlet passage 50 which extends through a cap portion 52 in the housing 12. Disposed within the passage 46 and the outlet passage 50 is a cylindrical conduit 56 having a spherical end portion rotatably disposed within the spherical cavity 48 of the elastomeric body 14. Conduit 56 is journalled within a nylon bushing or sleeve 54 and is adapted to receive a spout member 58 at the upper end thereof as shown in FIG. 1.

The outlet passage 44 from the cavity 16 is placed in fluid communication with the passage 46 by virtue of a spaced relationship which exists between the bottom surface of the body 14 and the bottom interior surface of the housing 12. To maintain this spaced relationship, a lip 60 is formed on the periphery of the body 14 to overly the upper peripheral lip 62 of the cup member 22. The cap 52 of the housing 12 is disposed over the engaging lips 60 and 62 and is fastened into place by means of screws, as shown, to maintain the body 14 in the proper position within the housing 12 and also to provide a fluid-tight seal therebetween.

The valve member 18 is provided with a diametrically extending, horizontal passage 64 which can be placed in direct fluid communication with the inlet 40 and 42, and an outlet passage 66 which intersects the through passage 64 in a perpendicular relationship as best shown in FIG. 2. Integrally connected to the valve member 18 is a stem 68 which extends upwardly through a beveled opening 69 in body 14 and a uniaxially flaring opening 70 in the cap 52 and is secured by means of a threaded engagement to the handle 20. A motion limiter 72 in the form of a horizontally extending screw is threaded into and through the housing 22 and the elastomeric body 14 so as to extend into a horizontally extending groove 74 in the rear spherical surface of the valve member 18. This motion limiter permits the handle 20 and the valve member 18 to be rotated about a first axis which corresponds with the longitudinal axis of stem 68 as well as about a second axis which intersects the first axis at right angles and extends horizontally through the assembly 10, as shown in FIG. 1. Motion of handle 20 is also controlled by the geometry of opening 70.

By way of additional detail, a set screw 76 secures the spout member 58 to the sleeve 56. A seal 78 is provided to prevent leakage between the sleeve 56 and the spout 58. A spray outlet 80 is formed integrally with the cup 22 of the housing 12 and in fluid communication with the outlet passage 46. Accordingly, a spray device having a flexible supply conduit may be secured to the outlet 80 for manual use such as one finds in the typical domestic kitchen sink. It is assumed that such a spray device is provided with its own valve which valve is normally in the closed condition. The spherical bodies 18 and 56 are forced into cavities 16 and 48, respectively, through the beveled openings thereto as shown prior to insertion of body 14 into cup 22.

The operation of the embodiment of FIGS. 1 and 2 will now be described. The housing 12 is fastened to the support surface 32 by means of clamping ring fixtures 34 and 36. Inlet conduit 28 is suitably connected to a hot water supply line. Inlet conduit 30 is suitably connected to a cold water supply line. Handle 20 and valve member 18 are normally rotated about the longitudinal axis of the stem 68 such that the passage 64 does not register with either of the inlet passages 40 and 42. Accordingly, fluid cannot pass through the spherical valve member 18 to the outlet passage 66 and no fluid issues from the spout member 68. To control the degree of flow, the fluted handle 20 is grasped manually and rotated about its own axis to bring the passage 64 into increasingly greater registration with the diametrically opposite inlet passages 40 and 42. The portion of the passage 64 which registers with the inlet passages 40 and 42 can be increased by continued rotation of the handle 20, the greater the registration the greater the quantity of water which can flow through the valve member 18 through the outlet passage, through the space beneath the elastomeric body 14, and through the outlet conduit 56.

With the handle 20 and the stem 68 in the upright position shown in FIG. 2, equal quantities of hot and cold water are admitted to the passage 64 and, thus, a balance of hot and cold water is obtained. The two fluid streams are mixed in the outlet passage 44 and in the outlet conduit or sleeve 56. To increase the ratio of hot to cold water, the handle 20 is rotated in the counterclockwise direction as shown in FIG. 2 to increase the registration between the passage 64 and the hot water inlet passage 40 while decreasing the registration between the passage 64 and the cold water inlet passage 42. It will be observed that the diametral passage 64 in the valve member 18 is offset relative to the axis which is common to both inlet passages 40 and 42. To increase the ratio of cold water to hot water which flows through the valve member 18, the handle 20 is rotated in the clockwise direction as shown in FIG. 2, thus, to produce an increased registration between passages 64 and 42 and a decreased registration between passages 64 and 40. The degree or quantity of water flowing through the valve member 18 can be varied in any of the angular orientations of the handle 20 which corresponds to a particular flow balance.

To activate spray outlet 80, the valve member which is common to hand-held spray units is opened and water flows through the spray outlet 80 to the spray unit. A restriction may be placed in the spout member 58 so that the fluid flow prefers the spray route whenever the spray unit valve is open.

Figure 3:
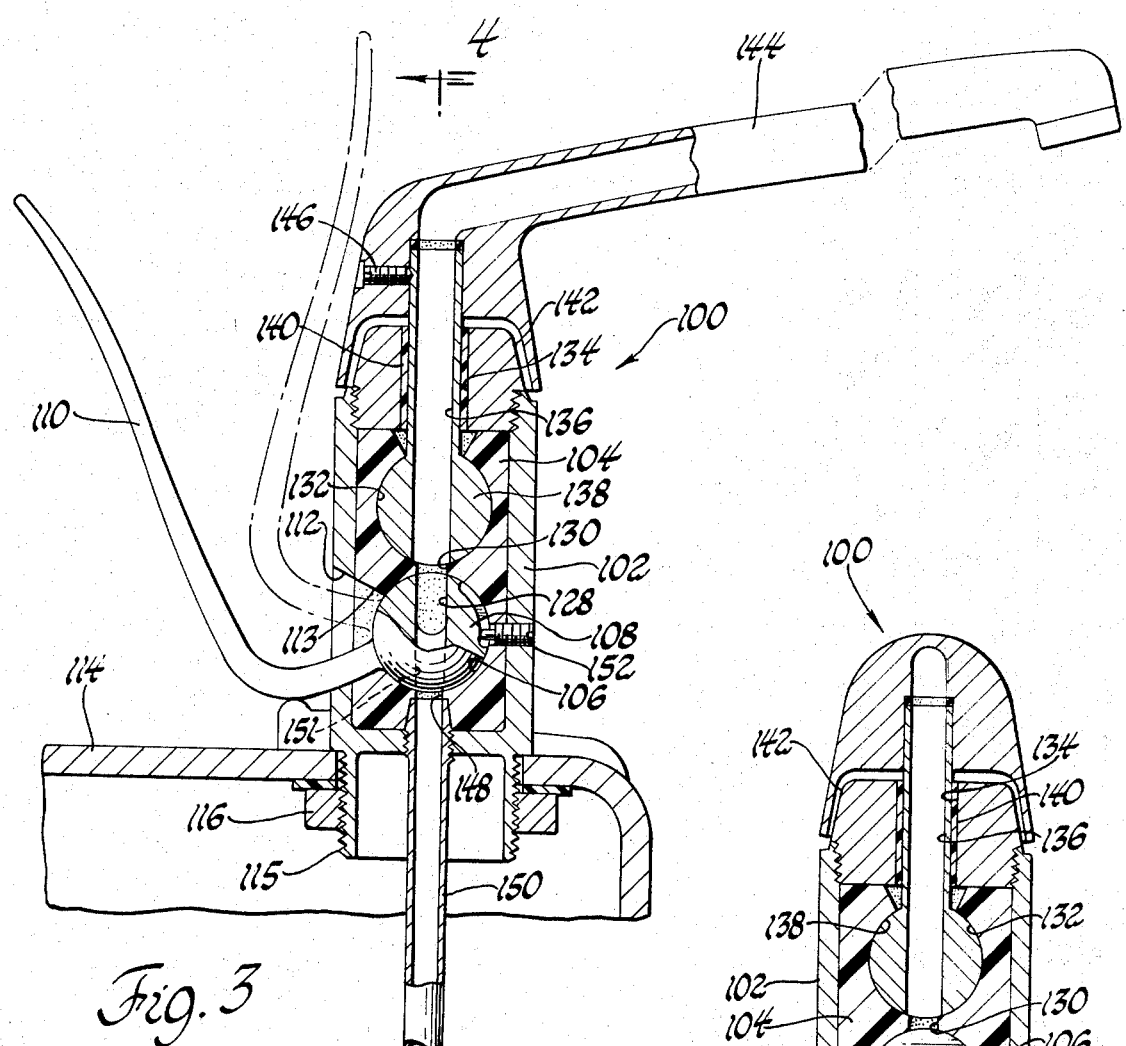
FIG. 3 is a side view in cross-section of the second embodiment.
Figure 4:
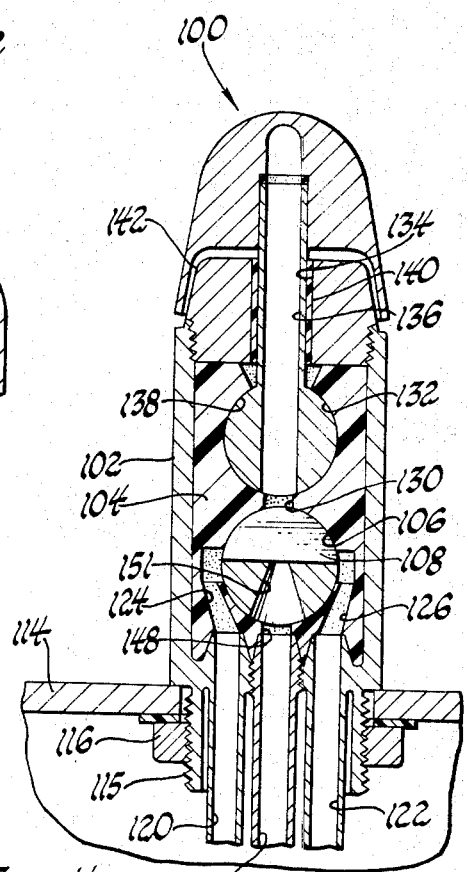
FIG. 4 is a front view in cross-section of the second embodiment.

Referring now to FIG. 3 and 4, the second embodiment of the invention is illustrated in an assembly 100 including a hollow cylindrical housing 102 having secured therein a generally cylindrical elastomeric body 104. Body 104 is formed with a first spherical cavity 106 which receives and supports in sealing relation a spherical valve member 108. A handle 110 is mechanically connected to the spherical valve member 108 for control purposes and extends through registering, outwardly flared openings 112 and 113 in the housing 102 and body 104, respectively. Handle 110 is manually operable to rotate the valve member 108 about each of two mutually perpendicular axes to be described, to vary the degree of flow through the assembly 100 as well as the balance of flow between hot and cold water streams as will be described in detail in the following paragraphs.

Housing 102 has a threaded base 115 of reduced diameter which is disposed in an opening in a support surface 114, such as a sink or counter top, and is maintained in position by means of a clamp ring and washer fixture 116. Housing 102 has formed therein parallel and vertically extending hot and cold water inlet passages 120 and 122. These passages 120 and 122 are in fluid communication with inlet passages 124 and 126, respectively, in the elastomeric body 104. Passages 124 and 126 are formed with right-angle portions so as to intersect with the spherical cavity 106 at substantially diametrically opposite positions, as best shown in FIG. 4.

Valve member 108 is provided with a passage portion 128 generally in the form of a chordal slice which by rotation of the valve member 108 about a first horizontal axis can be placed in registration with an outlet passage 130 from the cavity 106. Outlet passage 130 is in fluid communication with a spherical cavity 132 in body 104 which is contiguous with a second outlet passage 134 formed in a cap 142 which is threadedly engaged with housing 102. Passage 132 is adapted to receive an outlet conduit 136 having a spherical end portion 138 disposed in the cavity 134. A teflon bushing or sleeve 140 is disposed between the conduit 136 and the passage 132 in the area of the cap 142. A spout member 144 is connected to the outlet passage 136 by means of a fluid seal and a set screw 146 such that the spout member 144 and the outlet passage 136 can be rotated together relative to the housing 102 about a vertical axis. The cap 142 bears against the top of body 104 to secure it tightly into housing 102.

Cavity 106 in the elastomeric body 104 is also provided with a downwardly opening outlet passage 148 which receives a threaded tubular conduit 150 to form the outlet passage in the housing 102. Valve member has formed therein a downwardly oriented outlet passage portion 151. Outlet passage conduit 150 is a spray outlet and is adapted to be connected to a manually operated spray unit having its own valve assembly. Again, such spray devices are well known in the art and will not be illustrated or described in detail.

A screw 152 is horizontally threaded through the housing 102 and the elastomeric body 104 into a groove 154 in the face of the valve member 108 so as to limit the rotation of the valve member to rotation about two mutually perpendicular and horizontal axes. Rotation about a horizontal axis which is normal to the plane of the paper in FIG. 3 controls the degree of fluid flow through the assembly 100. Rotation of the valve member 108 about a horizontal axis which is normal to the plane of the paper in FIG. 4 varies the balance of hot to cold water flowing through the assembly 100.

Discussing now the operation of the embodiment of FIGS. 3 and 4 the conduits 120 and 122 are suitably connected to hot and cold water supply lines by means of conventional plumbing. Handle 110 is normally disposed in a substantially vertical orientation close to the housing 102 as shown by the dotted lines in FIG. 3. In this condition, the passage portion 128 of the valve member 108 is not in registration with the outlet passage 130 from the cavity 106. Therefore, while fluid may enter the passage portion 128 by way of the inlet passages 124 and 126, no fluid may enter the outlet passage 130 and no fluid flows through the spout member 144. The valve on the spray device, if a spray device is used, is kept closed and, thus, no fluid flows through the spray outlet 150. To open the valve assembly 100 in a gradual fashion, the handle 110 is moved rearwardly relative to the housing 102; i.e., in the counterclockwise direction as viewed in FIG. 3. This causes gradually increased registration between the passage portion 128 of the valve member 108 and the outlet passage 130 from the cavity 106. Therefore, an increasing quantity of water may flow through the outlet passage 130 through the conduit 138 and through the spout member 134.

Assuming the handle 110 is in the vertically upright position relative to the housing 102 it can be seen by reference to FIG. 4 that the valve member 108 is disposed in a symmetrical position relative to the hot and cold water inlet passages 124 and 126. Accordingly, equal quantities of hot and cold water will flow through the valve member 108 and into the outlet passage 130. To increase the ratio of hot to cold water, the handle 110 is moved so as to rotate the valve member 108 in the counterclockwise position as shown in FIG. 4. This increases the registration between the passage portion 128 and the valve member 108 and the hot water inlet passage 124. At the same time, such motion decreases registration between the passage portion 126 and the inlet passage 126. To increase the ratio of cold to hot water, a reverse movement is employed; i.e., the valve member 108 is rotated in the clockwise direction as shown in FIG. 4 to increase registration between the passage portion 128 and the inlet passage 126. It is possible to rotate the valve member 108 either completely clockwise or counterclockwise to the extent permitted by the housing 102 and the handle 110 to obtain only cold or hot water from the spout member 144.

It will be observed that the screw 152 limits the motion of the handle 110 to motion about the two perpendicular axes of the assembly 100 as seen in FIGS. 3 and 4. The handle 10 cannot be twisted or rotated about a substantially vertical axis because of the interference between the vertically oriented groove 154 and the inner end of the screw 152.

Figure 5:
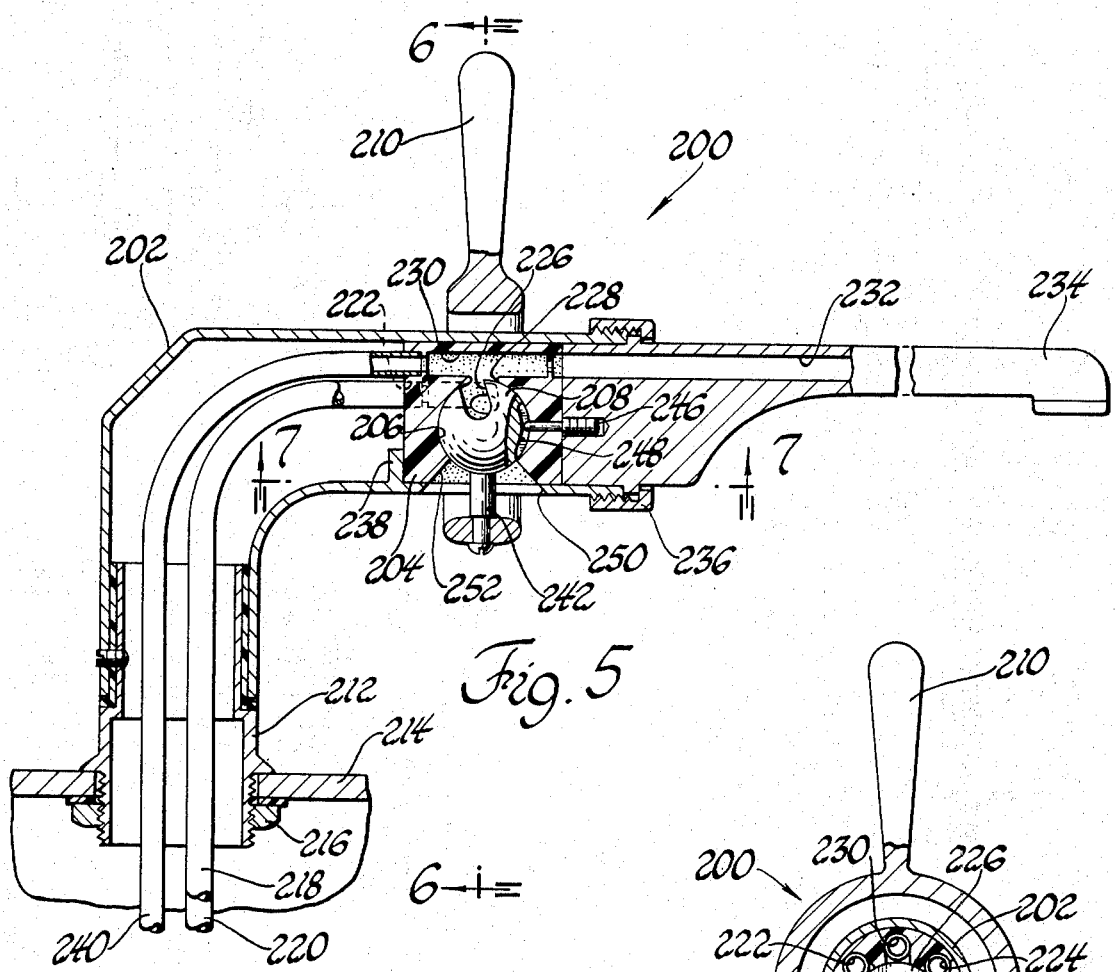
FIG. 5 is a side view in cross-section of the third embodiment.
Figure 7:
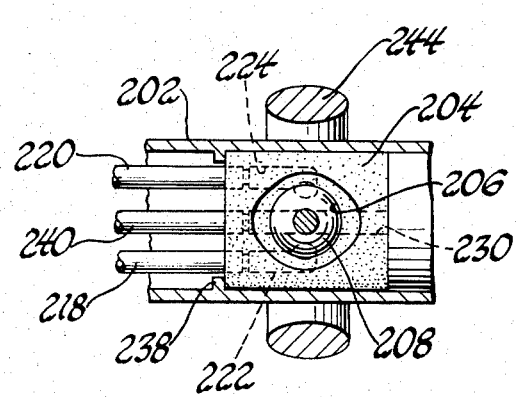
FIG. 7 is a view along section line 7—7 of FIG. 5.
Figure 6:
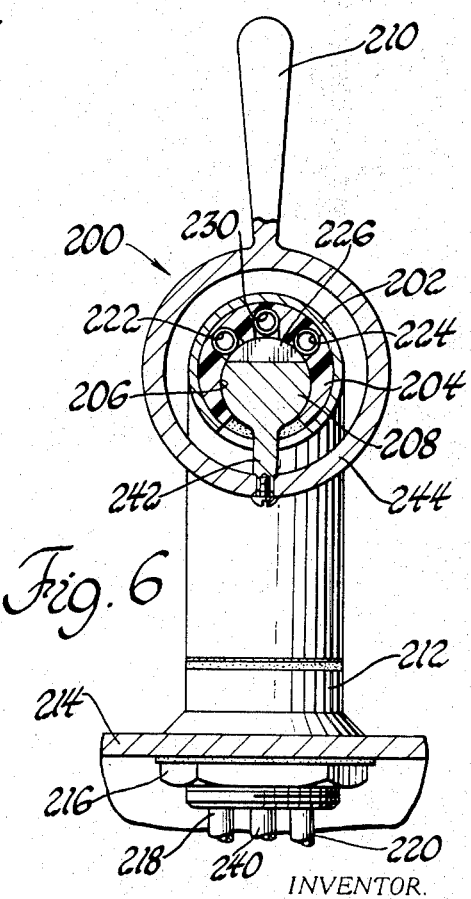
FIG. 6 is a front view partly in cross-section of the third embodiment.

FIGS. 5, 6 and 7 illustrate a third embodiment of the invention in the form of an assembly 200 having a L-shaped hollow, tubular housing 202 of chromed or stainless steel or the like carrying therein an elastomeric body 204 having a single spherical cavity 206. Disposed within the cavity 206 is a substantially spherical valve member 208 which is rotatable about two mutually perpendicular axes by manual manipulation of a handle 210. Such manual manipulation of handle 210 controls the degree of fluid flow through the assembly 200 as well as the balance or ratio of the flow of two fluids to be mixed or exclusively valved in accordance with the following specification.

Housing 202 includes a base portion 212 which is adapted to be secured to a support surface 214 by means of a conventional clamping ring fixture 216. Housing 202 has disposed therein a pair of flexible fluid conduits 218 and 220 which serve as inlet passages for hot and cold water streams to the assembly 200. Hot water passage 218 is in fluid communication with a hot water inlet passage 222 in the elastomeric body 204. As shown in FIG. 5, the flexible conduit 218 may be made integrally with the body 204. Similarly, the cold water inlet passage 220 is in fluid communication with a cold water inlet passage 224 in the body 208. The inlet passages 222 and 224 enter the cavity 206 at substantially diametrically opposite positions as best shown in FIG. 6. Valve member 208 has formed therein a passage portion 226 in the general configuration of a chordal slice which can be registered with both or either of the inlet passages 222 and 224 and an outlet passage 228 from the cavity 206. Outlet passage 228 extends substantially vertically of the assembly 200, as shown in FIG. 5, and intersects perpendicularly with a second outlet passage 230 in the body 204. Outlet passage 230 extends completely through the body 204 as best shown in FIG. 5 and is in fluid communication with the passage 232 in a spout member 234. Spout member 234 is secured to the housing 202 by means of a clamp ring 236 which threads onto the upper end of the housing 202 such that the inner end of the spout member 234 abuts the forward wall of the elastomeric body 204 and slightly compresses the body 204 against an inner retainer wall 238 which is part of the housing 202. Passage 232 is also contiguous with a spray outlet conduit 240 which is adapted for connection to a conventional, manually-operated spray unit as previously described.

Valve member 208 is connected to the handle 210 by means of the vertically extending stem 242 which is connected to a ring 244 which encircles the housing 202. Ring 244 is integral with the handle portion 210. A motion synchronizing device is employed to limit the rotation of the valve member 208 to rotation about two mutually perpendicular axes. Such motion synchronization or limiting is accomplished by means of a set screw 246 which is threaded into the spout member 234 such that the outer end engages a groove 248 in the surface of the valve member 208. The groove 248 is substantially vertically oriented such that rotation is limited to the two perpendicular horizontal axes through the valve member 208 and normal to the plane of the paper in FIGS. 5 and 6. Rotation about the axis through the valve member 208 which is normal to the plane of the paper in FIG. 5 controls the degree of registration between the passage portion 226 and the outlet passage 228 thus to control the quantity of water which is passed by the assembly 200. Rotation of the valve member 208 about the axis through the valve member which is normal to the plane of the paper in FIG. 6 controls the ratio or balance of hot and cold water flowing through the assembly 200 in any given quantity of flow.

Describing the operation of assembly 200 of FIGS. 5 and 6, the base 212 of the housing 202 is secured to the support surface 214 by means of the clamping fixture 216. The conduit 218 and 220 are suitably connected to cold and hot water supply lines by conventional plumbing. The conduit 240 is connected to a conventional spray unit if desired. If no spray unit is desired, the conduit 240 is plugged and sealed. With the handle 210 urged rearwardly of the assembly 200 that is, counterclockwise as shown in FIG. 5, the passage portion 226 may be taken completely out of registration with the outlet passage 228. Therefore, even though the passage portion 226 of the valve member 208 registers with one or both of the inlet passages 222 and 224 no fluid flows through the fluid passage portion 226 and no fluid flows through the spout 234. To gradually increase the flow of fluid through the assembly 200 the handle 210 is brought gradually forward, that is, in the clockwise direction as seen in FIG. 5 to gradually register more and more of the passage portion 226 with the outlet passage 228. The greatest degree of registration between passages 226 and 228 preferably corresponds with the mechanically limited or stopped position of the handle 210 relative to the housing 202. This is conveniently accomplished by suitable sizing of the outwardly flared apertures 250 and 252 in the housing 202 and elastomeric body 204 through which the stem 242 extends.

To vary the balance or ratio of cold to hot water the handle 210 is moved clockwise or counterclockwise, as shown in FIG. 6, to rotate the valve member 208. Again, the passage portion 226 is redially offset relative to the inlet passages 222 and 224 such that in the straight up-and-down position, shown in FIG. 6, the cold and hot inlet passages 222 and 224 are both approximate half-way open and a balanced flow condition exists. To increase the ratio of cold to hot water the handle 210 is moved counterclockwise to increase the registration between the passage portion 226 and the cold water inlet passages 222. This automatically decreases registration between the passage portion 226 and the hot water inlet passage 224. To increase the ratio of hot to cold water flowing through the assembly 200, handle 210 is moved in the clockwise direction to perform a reverse action. Again, total registration of one inlet passage 222 or 224 and total deregistration of the other preferably occur at an angular position which is mechanically limited by interference between the stem 242 and the aperture 250 and the housing 202.

It is to be understood that the embodiments specifically described herein are only illustrative of the invention and are not to be construed in a limiting sense.

The embodiments of the invention in which an exclusive property or privilege is claimed are defined as follows:

1. A valve assembly comprising: a housing having first and second inlet passages and an outlet passage; an elastomeric body secured within the housing and defining a spherical cavity having first and second inlet passages and an outlet passage; a second outlet passage in said body in communication between the outlet passages of said cavity and housing; the inlet passages of the cavity being in registry with the inlet passages of the housing; a spherical valve member sealingly disposed within the cavity and solely secured by the body; a passage portion in the valve member; and means including a handle connected to the valve member for rotating the valve member within the cavity about only two axes to vary the degree to which the passage portion establishes communication between the inlet and outlet passages.

2. A valve assembly as defined in claim 1 wherein the outlet passage of the housing is coextensive with a spout member.

3. A valve assembly as defined in claim 1 wherein the handle means for rotating comprises a stem connected to the valve member and projecting from the housing, the handle being rotatable about the axis of the stem to control the degree of flow through the inlet passages, and rotatable about an axis perpendicular to the stem axis to control the balance of flow through the inlet passages.

4. A valve assembly as defined in claim 1 wherein the housing is generally cylindrical and includes a cup portion receiving the body and a cap portion for securing the body within the cup portion.

5. A valve assembly as defined in claim 1 wherein the passage portion of the valve member comprises a diametral through passage and a radial passage intersecting perpendicularly therewith.

6. A valve assembly as defined in claim 5 wherein the inlet passages in the housing and body are substantially diametrically opposed.

7. A valve assembly as defined in claim 1 wherein the housing comprises a cup portion having a peripheral lip, the body having a peripheral lip sealingly engaging the lip of the cup.

8. A valve assembly as defined in claim 7 wherein the housing includes a cap portion disposed over the lip of the body to maintain the sealing engagement thereof with the lip of the cup.

9. A valve assembly as defined in claim 1 wherein the bottom of the body is maintained in spaced relationship with the bottom of the housing to provide fluid communication between the outlet passage of the cavity and the second outlet passage of the body.

10. A valve assembly as defined in claim 9 wherein the second outlet passage of the body is defined by a second spherical cavity and a spout member having a spherical end portion sealingly and rotatably disposed therein.

11. A valve assembly as defined in claim 10 wherein the second outlet passage extends completely through the body, the housing including a spray outlet in communication with the second outlet passage.

12. A valve assembly as defined in claim 1 wherein the means for rotating includes a handle connected to the valve member and being rotatable about a first axis to control the degree of flow through the outlet passage of the cavity and rotatable about a second axis to control the balance of flow through the inlet passages.

13. A valve assembly as defined in claim 12 wherein the inlet passages of the body are diametrically opposed at the cavity.

14. A valve assembly as defined in claim 13 wherein the outlet passage of the cavity extends along a line between the inlet passages and communicates directly through the body with the second outlet passage of the body.

15. A valve assembly as defined in claim 14 wherein the second outlet passage of the body includes a second spherical cavity within the body and a spout member having a spherical end portion sealingly and rotatably disposed within the second cavity.

16. A valve assembly as defined in claim 15 wherein the second outlet passage of the body extends completely through the body, and a spray outlet in the housing and communicating with the second outlet passage.

17. A valve assembly as defined in claim 16 wherein the second outlet passage extends substantially longitudinally of the housing.

18. A valve assembly as defined in claim 1 wherein the second outlet passage of the body extends completely through the body adjacent the cavity, the outlet passage of the cavity extending between the cavity and the second outlet passage.

19. A valve assembly as defined in claim 18 including a spout member apivotally connected to the housing and in fluid communication with the second outlet passage.

20. A valve assembly as defined in claim 19 wherein the body is secured between a wall of the housing and the spout member.

21. A valve assembly as defined in claim 19 wherein the housing comprises a hollow tubular portion, a plurality of fluid conduits disposed therein, one of the conduits being connected to the second outlet passage.

22. A valve assembly as defined in claim 21 wherein the means for rotating comprises a stem connected to the valve member and a ring portion encircling the housing.

* * * * *